(12) United States Patent
Kalhoff et al.

(10) Patent No.: US 8,549,136 B2
(45) Date of Patent: Oct. 1, 2013

(54) SYSTEM FOR OPERATING AT LEAST ONE NON-SAFETY-CRITICAL AND AT LEAST ONE SAFETY-CRITICAL PROCESS

(75) Inventors: Johannes Kalhoff, Blomberg (DE); Rahlves Lutz, Blomberg (DE); Steffen Horn, Schieder-Schwalenberg (DE)

(73) Assignee: Phoenix Contact GmbH & Co. KG (DE)

( * ) Notice: Subject to any disclaimer, the term of this patent is extended or adjusted under 35 U.S.C. 154(b) by 438 days.

(21) Appl. No.: 12/247,369

(22) Filed: Oct. 8, 2008

(65) Prior Publication Data

US 2009/0125578 A1 May 14, 2009

(30) Foreign Application Priority Data

Oct. 22, 2007 (DE) .......................... 10 2007 050 708

(51) Int. Cl.
*G06F 15/173* (2006.01)
(52) U.S. Cl.
USPC .......... 709/224; 137/487.5; 340/664; 714/45; 714/47.1; 714/735; 714/E11.07; 714/E11.017; 370/216; 370/241; 702/183; 455/557; 710/305; 709/218; 709/206; 709/221; 707/999.102; 435/6.11; 324/750.3
(58) Field of Classification Search
USPC ....................................................... 709/224
See application file for complete search history.

(56) References Cited

U.S. PATENT DOCUMENTS

| | | | | |
|---|---|---|---|---|
| 4,495,573 A | * | 1/1985 | Ballegeer et al. | 710/110 |
| 4,652,057 A | * | 3/1987 | Engle et al. | 303/3 |
| 4,792,269 A | * | 12/1988 | Engle | 410/53 |
| 5,339,261 A | * | 8/1994 | Adelson et al. | 714/47.1 |
| 5,455,503 A | * | 10/1995 | Kohler | 323/273 |
| 5,521,849 A | * | 5/1996 | Adelson et al. | 702/119 |
| 5,561,767 A | * | 10/1996 | Eisenberg et al. | 714/47.1 |

(Continued)

FOREIGN PATENT DOCUMENTS

| | | | |
|---|---|---|---|
| CA | 2612564 A1 | * | 12/2006 |
| DE | 196 12 423 A1 | | 10/1997 |

(Continued)

OTHER PUBLICATIONS

Ali, "Problems, Concerns and Possible Solutions for testing (and diagnostics coverage) of final control element of SIF loops", 2004.*

(Continued)

*Primary Examiner* — Ondrej Vostal
(74) *Attorney, Agent, or Firm* — Kaplan Breyer Schwarz & Ottesen, LLP

(57) ABSTRACT

For the operation of at least one non-safety-critical application process and at least one safety-critical application process, the invention proposes a data processing and transmission system with a data transmission network, at least one non-safety-related network element linked to the non-safety-critical application process and connected to the network, and with at least one safety-related network element linked to the safety-critical application process, as well as with at least one master unit connected to the network, and a server unit connected to the network separately from the master unit, wherein the safety-related server unit controls the at least one safety-critical application process, specifically by processing safety-relevant data necessary for controlling the safety-critical application process and by organizing the transmission of the safety-relevant data over the network by means of at least one of the network elements and/or the master unit.

5 Claims, 2 Drawing Sheets

(56) References Cited

U.S. PATENT DOCUMENTS

| | | | |
|---|---|---|---|
| 5,721,737 A * | 2/1998 | Radjabi et al. | 370/449 |
| 5,727,110 A * | 3/1998 | Smith et al. | 385/147 |
| 6,307,483 B1 * | 10/2001 | Westfield et al. | 340/870.11 |
| 6,320,532 B1 * | 11/2001 | Diede | 342/124 |
| 6,370,448 B1 * | 4/2002 | Eryurek | 700/282 |
| 6,393,362 B1 * | 5/2002 | Burns | 701/301 |
| 6,611,722 B2 * | 8/2003 | Behr et al. | 700/3 |
| 6,889,166 B2 * | 5/2005 | Zielinski et al. | 702/183 |
| 7,027,952 B2 * | 4/2006 | DelaCruz et al. | 702/183 |
| 7,035,224 B2 * | 4/2006 | Fuhrmann et al. | 370/252 |
| 7,117,122 B2 * | 10/2006 | Zielinski et al. | 702/183 |
| 7,228,186 B2 * | 6/2007 | Karschnia et al. | 700/19 |
| 7,289,861 B2 * | 10/2007 | Aneweer et al. | 700/110 |
| 7,430,451 B2 * | 9/2008 | Muneta et al. | 700/21 |
| 7,526,405 B2 * | 4/2009 | Miller | 702/179 |
| 7,953,501 B2 * | 5/2011 | Zielinski et al. | 700/21 |
| 8,180,466 B2 * | 5/2012 | Longsdorf et al. | 700/79 |
| 2002/0040607 A1 * | 4/2002 | Kleven | 73/861.52 |
| 2002/0048274 A1 * | 4/2002 | Fuhrmann et al. | 370/407 |
| 2002/0093951 A1 * | 7/2002 | Rupp et al. | 370/362 |
| 2002/0126620 A1 * | 9/2002 | Heckel et al. | 370/216 |
| 2002/0138668 A1 * | 9/2002 | Heckel | 710/4 |
| 2002/0167904 A1 * | 11/2002 | Borgeson et al. | 370/241 |
| 2002/0183863 A1 * | 12/2002 | Eryurek | 700/2 |
| 2003/0224784 A1 * | 12/2003 | Hunt et al. | 455/426.2 |
| 2004/0010651 A1 * | 1/2004 | Wiegert | 710/305 |
| 2004/0030482 A1 * | 2/2004 | Fuehrer et al. | 701/76 |
| 2004/0182167 A1 * | 9/2004 | Orth et al. | 73/753 |
| 2004/0210326 A1 * | 10/2004 | Muneta et al. | 700/82 |
| 2004/0224640 A1 * | 11/2004 | Baccelli et al. | 455/67.11 |
| 2004/0225615 A1 * | 11/2004 | Abert | 705/64 |
| 2005/0097194 A1 * | 5/2005 | Eisenbeis et al. | 709/221 |
| 2005/0101307 A1 * | 5/2005 | Brugge et al. | 455/414.1 |
| 2005/0109395 A1 * | 5/2005 | Seberger | 137/8 |
| 2005/0114186 A1 * | 5/2005 | Zielinski et al. | 702/184 |
| 2006/0010441 A1 * | 1/2006 | Jahn et al. | 718/100 |
| 2006/0062091 A1 * | 3/2006 | Lenz et al. | 369/13.25 |
| 2006/0190101 A1 * | 8/2006 | Seizinger | 700/79 |
| 2006/0291657 A1 * | 12/2006 | Benson et al. | 380/270 |
| 2007/0067725 A1 * | 3/2007 | Cahill et al. | 715/733 |
| 2007/0177615 A1 * | 8/2007 | Miliefsky | 370/401 |
| 2007/0213038 A1 * | 9/2007 | Masseroni et al. | 455/414.3 |
| 2008/0137528 A1 * | 6/2008 | O'Toole et al. | 370/216 |
| 2008/0268784 A1 * | 10/2008 | Kantzes et al. | 455/66.1 |
| 2008/0301309 A1 * | 12/2008 | Parkinson | 709/229 |
| 2009/0119437 A1 * | 5/2009 | Hilscher | 710/305 |
| 2010/0021378 A1 * | 1/2010 | Rousso et al. | 424/1.11 |
| 2010/0208595 A1 * | 8/2010 | Zhao et al. | 370/242 |

FOREIGN PATENT DOCUMENTS

| | | |
|---|---|---|
| DE | 199 28 517 A1 | 1/2001 |
| DE | 10151119 A1 | 4/2003 |
| DE | 10212130 A1 | 10/2003 |
| DE | 10 2004 029 022 A1 | 2/2005 |
| DE | 103 30 916 A1 | 2/2005 |
| DE | 102004029022 A1 | 2/2005 |
| EP | 1353246 A2 | 10/2003 |
| EP | 1 589 386 A1 | 3/2005 |
| WO | 2004095716 A2 | 11/2004 |

OTHER PUBLICATIONS

Singh, "Contraint-based Structuring of Distributed Protocols", 1995.*
Adler, "Using Hart to Increase Field Device Reliability".*
Hart communication foundation, "Wireless Hart the first Simple, Reliable and Secure wireless standard for process monitoring and control", 2007.*
Hart communication foundation, "Hart Communication Application Guide", 2011, copyright (1997-2010).*
Terwiesch et al., "Trends in Automation", 2009.*
Lightbody, "Approval Report", 1998.*
Egea-Lopez et al., "Wireless communications deployment in industry: A review of issues, options and technologies", 2004.*
Bowen et al., "Considerations for the design of smart sensors", 1995.*
Poledna et al., "Communication Bus for Automotive Applications".*
Poledna et al., "TTP: "Drive by Wire" in greifbarer Nahe", 1999.*
Goble et al., "Failure Modes, Effects and Diagnostic Analysis Project: 644 HART Temperature Transmitter", 2005.*
Kobosko et al., "The Intrinstically Safe Monitoring System with Intelligent Sensors", 2004.*
IEC, "Functional safety of electrical/electronic/programmable electronic safety-related systems—Part 4: Definitions and abbreviations", 1998.*
IEC, "Functional safety of electrical/electronic/programmable electronic safety-related systems—Part 3: Software requirements", 1998.*
IEC, "Functional safety of electrical/electronic/programmable electronic safety-related systems—Part 0: Functional safety and IEC 61508", 2005.*
HART Communication Foundation, "HART Field Communications Protocol Application Guide HCF LIT 34", 1999.*
Knight, "Safety Critical Systems: Challenges and Directions", 2002.*
"Open Solution for the World of Automation", "Profibus, Technologie and Anwendung, Systembeschneibung,", Oct. 2002, Publisher: Internet excerpt from http://www.profibus.com/pall/meta/downloads/article/00454/, Published in: DE.
Profibus Working Group, "PROFIsafe—Profile for Safety Technology", "PROFIBUS", Oct. 2002, No. 3.092, Publisher: PROFIBUS Nutzerorganisation e.V.
Joachim Gerstein, "DE Application No. DE 10 2007 050 708 ", Nov. 6, 2009, Publisher: Gramm, Lins & Partner, Published in: DE.
German Office Action, German Patent Office, Aug. 1, 2008.
Jean-Marc Kuntz, "European Office Action for International Application No. 08018377.5-2206", May 7, 2010, Publisher: European Patent Office, Published in: EPO.

* cited by examiner

SYSTEM FOR OPERATING AT LEAST ONE NON-SAFETY-CRITICAL AND AT LEAST ONE SAFETY-CRITICAL PROCESS

FIELD OF THE INVENTION

The invention relates to a data-processing and transmission system for operating at least one non-safety-critical application process and at least one safety-critical application process.

BACKGROUND OF THE INVENTION

As is known, a process is referred to in safety engineering as safety-critical if it can result in a non-negligible danger in case of a fault, so that it must be guaranteed for this case that a safe state will be taken up.

In current safety engineering, safety relays, secure controllers and small safety controllers are principally used.

Safety relays are understood to be electromechanical or electronic components that perform complete ready-made safety functions, which can optionally be parameterized by means of switches or wiring. Secure inputs and outputs are directly wired to the safety relay.

Small safety controllers are understood to be electromechanical or electronic components that can perform various safety functions by simple auxiliary means, e.g., an interface that is programmable to a limited extent, or switch combinations. Ready-made safety functions are simply linked to the small controllers. The number of inputs and outputs can be increased, flexibly if desired, to a slight extent by expansion components. Sometimes network access is also offered.

Safety controllers, on the other hand, offer the advantages of a flexible control system with network connection, high performance, and a flexibly programmable interface, and conform to the IEC 61131 standard, for example.

Secure or safety-oriented devices and components are fundamentally devices and components that are secure, due to suitable measures, with respect to the data to be processed and/or transmitted by them. This can be accomplished, for instance, by a redundant design of the processing or transmitting structure, by adding a checksum to the data to be transmitted and/or by other measures conventionally known to those in the art.

Data processing and transmitting systems that connect decentralized input/output devices and controllers are used in current machines and systems. The networks that are used for transporting safety-relevant data are supported by secure network protocols. The signal flow that is used originates from a centralized safety technology, in which safety-relevant input data, generally acquired by sensors, that has been processed into secure input signals is transported to the secure controller, further processed there by a secure application, and then transported to the corresponding actuators.

Two tendencies have for a long time been noticeable in automation technology. The first is the decentralization of the control function, and the second is the integration of the safety technology into the control and network technology.

With decentralization, the controlling function is being shifted more and more into the output level. For example, the control function is being integrated, to a limited extent, into drive units. Strong interdependencies in the application process are produced by the integration of safety technology into controllers and networks. These interdependencies lead to more complex project engineering and programming of the systems.

In order to counteract this situation, quite different mechanisms are sometimes used. For example: the combination of secure and nonsecure on a common controller; secure and nonsecure on separate controllers; approval locally with decentralized secure units; decentralized safety controller with associated secure inputs and outputs in a network.

The disadvantageous aspects in combining secure and nonsecure control on a central platform, or in decentralized control technology as well, are the mutual functional dependencies, which in some cases can again be safety-critical. Additional disadvantages are performance losses and availability problems, and the safety technology must come from the same manufacturer as the standard controllers.

A control system for controlling safety-critical processes is known from DE 19928517, with a first control unit for controlling safety-critical processes that is linked via I/O channels to the safety-critical process, and additionally with a fieldbus via which the first control unit and the signal unit are connected, and with a bus master for controlling the communication on the fieldbus, wherein the first control unit and the signal unit have safety-related devices and are thus secure units, in order to guarantee a failsafe communication, and wherein the fieldbus provides a circulating telegram traffic between individual units connected to the fieldbus. In order to guarantee a failsafe communication of the units participating in the safety-critical process and, at the same time, to allow the use of standard components as the bus master, it was proposed, according to the above mentioned patent, that the bus master be connected to the fieldbus separately from the first control unit and the signal unit and the first control unit be arranged upstream of the signal unit relative to a circulation direction of the telegram traffic, wherein the first control unit further comprises means to replace telegram data addressed to the signal unit with failsafe telegram data.

A considerable disadvantage of the path proposed there, however, is that the secure control unit can in principle communicate with every single unit, but only insofar as it is aware of the network structure. Moreover, the secure control unit can only replace already existing information with secure information.

SUMMARY OF THE INVENTION

One problem of the invention is therefore to be able to execute safety engineering applications independently of the structure of the networks and the protocols, which will become more and more necessary in future systems. An additional problem of the invention is the separation of the secure control functions both from the standard control function, as well as from a network master function.

For the operation of at least one non-safety-critical application process and at least one safety-critical application process, the invention thus proposes a data processing and transmission system with a data transmission network, at least one non-safety-related network element linked to the non-safety-critical application process and connected to the network and with at least one safety-related network element, linked to the safety-critical application process, as well as with at least one master unit connected to the network and a server unit connected to the network separately from the master unit, wherein the safety-related server unit controls the at least one safety-critical application process, specifically by processing safety-relevant data necessary for controlling the safety-critical application process and by organizing the transmission of the safety-relevant data over the network by means of at least one of the network elements and/or the master unit, and wherein the master unit is constructed for providing operating means for transmitting the safety-relevant data and managing access rules during the data transmission via the network.

A considerable advantage of the invention is thus that the safety-related server unit according to the invention can be operated independently of any standard controller and network master unit, on any desired network structures and also with single master structures. The invention is therefore also preferred for use in the integration of safety technology into Ethernet-based systems.

BRIEF DESCRIPTION OF THE DRAWINGS

Embodiments of the invention will be explained below in detail and described with reference to the appended drawings. In the drawings.

DETAILED DESCRIPTION

Figure 1:
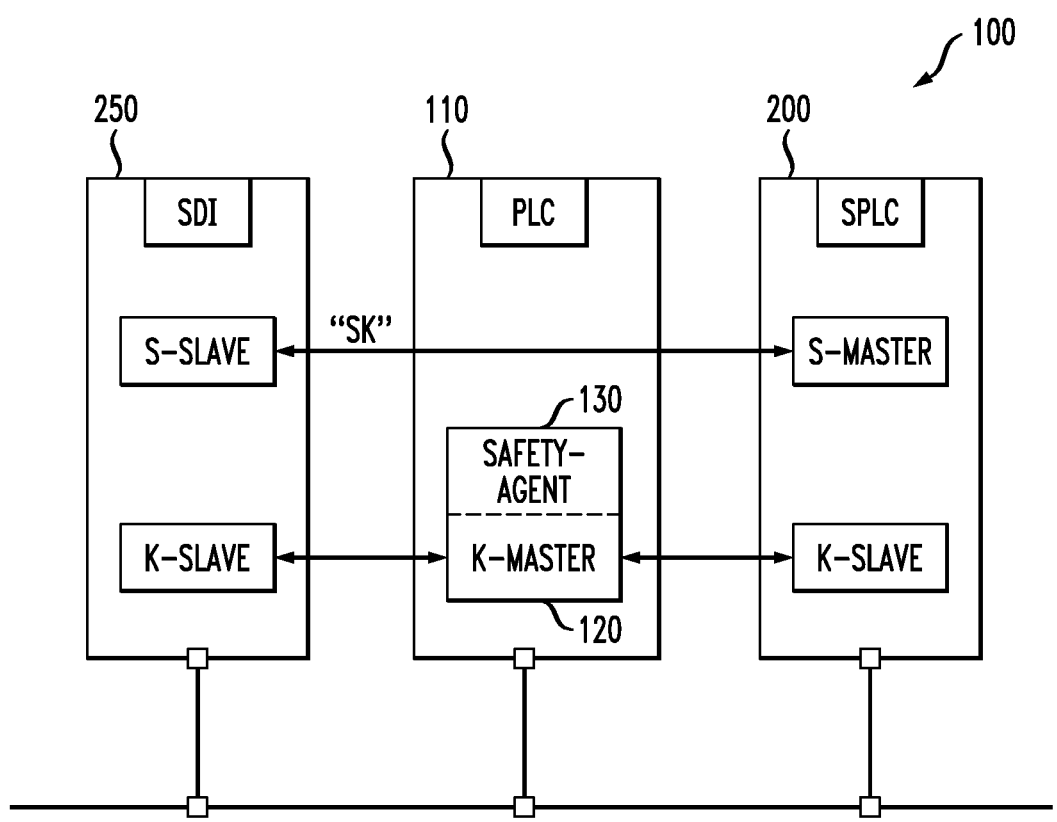
FIG. 1 shows, considerably simplified and schematically, the representation of one embodiment of the invention for a single master network.

For controlling at least one overall application process, the invention fundamentally provides that it be divided into two processes, one application process to be controlled by the safety-related units, and which is therefore a safety-critical application process, and one application process that can be controlled by non-safety-related units, i.e., a non-safety-critical application process. Control of these at least two processes independently of one another is performed via a common data processing and transmission system that comprises a data transmission network with connected network elements, and operated independently of one another.

Since the proportion of non-safety-critical application processes, also referred to below as standard application processes, is generally much larger than the proportion of safety-critical application processes, control of the non-safety-critical application process is advantageously foremost. Therefore, a network master unit is preferably associated with a device controlling such a standard process and is basically used to obtain data linked to the application process from I/O devices or I/O network elements connected to the network, or to allocate this data. The network master unit thus also provides the operating means for transmitting data via the network, and manages the access rules during data transmission via the network.

The secure application process is relocated to a separate safety controller that, in view of the communication necessary for the safety-critical application process, is formed as a safety-related server unit, also referred to below as a "safety server." It processes the safety-relevant data that is necessary for controlling the safety-critical application process and organizes the transmission of the safety-relevant data over the network by means of at least one of the network elements and/or the master unit. Since the network master unit is responsible for the operating means and access rules, the inventive use of the safety-related server unit is fundamentally independent of the data transmission network structure.

In single master data transmission networks, the safety-related server unit preferably acts as a communication slave, with respect to the communication via the data transmission network, and is equipped for that purpose with the appropriate communications interfaces.

For an application specific adaptation, there is an allocation of the network elements connected to the network that are relevant for controlling the safety-critical application process. This is preferably done via an allocation unit connected to the network, which can be integrated into the master unit and will be referred to below as a "safety agent." The safety-related server unit can thereby be made capable of organizing the safety-relevant communication between the network elements that are relevant to control of the safety-critical application process, i.e., particularly between those that are secure I/O devices.

In practice, the safety agent is equipped for this purpose with functional units via which it obtains information on all the connected secure and nonsecure network elements and their necessary communication relationships, or at least those that are necessary for the safety-critical process, or determines these automatically by interaction with the network master unit.

Based on this, the safety agent initializes the master unit, actively by generating corresponding connection lists, for example, or passively by describing necessary connections, whereupon the master unit operates the network in such a manner as to make possible, based on the standard communication, a superimposed safety communication between safety-related network components, for instance, several point-to-point relationships between the safety-related server unit and the secure I/O devices, with the server unit preferably being set up in this regard as a safety-related master and the I/O devices as safety-related slaves.

Particularly in single master networks, the safety agent in a practical implementation ensures that the relevant information of the network is available to the safety server when the system is running. This information is primarily the complete secure protocol data of secure input devices, but optionally also input data of standard input devices and information from the application process itself. When the system is running, the safety agent can additionally assure that, after the safety-relevant data has been processed, the results from the safety server are distributed to the relevant consumers inside the network. In particular, these results are the secure protocol data to the secure output devices, optionally also output data to standard output devices and information from the separate safety controller to the standard application process.

A considerable advantage of the invention is thus that the invention can be applied both to multi-master networks and to single master networks. In addition, extremely flexible and versatile application possibilities result from the network-independence of the invention. Particularly for networks of unknown origin, as is frequently the case in Internet-based applications, this proves to be a considerable advantage.

An example of a network, labeled 100 as a whole, is shown highly simplified and schematically in FIG. 1. The network 100 in the illustrated example is an Ethernet network that comprises a central network master and is, hence, an example of a single master network.

A standard control unit 110 with programmable logic (PLC, programmable logic control) is connected to the bus of the network. The control unit 110 is adapted to control a nonsecure or standard application process and contains a network master 120 in order to obtain data linked to this application process from network elements connected to the network, or to allocate this data. The network master 120, also referred to in FIG. 1 as a K-master, thus fundamentally guarantees the communication between the individual network components 110, 200, 250 in the network.

Individual nonsecure devices or network elements for the nonsecure and thus the standard application process are not shown in FIG. 1 for reasons of simplicity, and the communication between them and the integrated K-master 120 in the standard control unit 110 takes place in a network-dependent specific manner familiar to a person skilled in the art.

In addition, an above-described safety agent 130 that is responsible for the communication between the below-described safety-related units is integrated into the network master 120.

Two safety-related devices connected to the network are shown, first a separate safety controller 200 as the safety-related server unit, also reproduced in FIG. 1 as an SPLC (safety programmable logic control), and second, a safety-related data input unit 250 as a safety-related I/O network element, also referred to in FIG. 1 as an SDI (safety data input) 250 comprising, for instance, a sensor monitoring a safety-critical subprocess.

With respect to the network 100 to which they are connected, both safety-related devices are connected as pure communication slaves containing devices and mechanisms that are necessary for this purpose and are conventionally familiar to a person skilled in the art.

With respect to the basic communication via the network, both the safety-related server unit 200 and the safety-related I/O devices 250 act as pure communication slaves, wherein the standard control unit 110 of the network master is assigned as the communication master 120. The communication master 120 is initialized by the integrated safety agent 130 in such a manner that, based on the standard communication via the network 100, a superimposed safety communication, indicated in FIG. 1 by the double arrow labeled "SK," is possible between the safety-related controller unit 200, advantageously set up and functioning as a safety master, and the I/O unit 250, set up and functioning as a safety slave.

As described above, the safety agent 130 obtains or ascertains all information and communication relationships necessary for the safety-critical process, and therefore assures that this relevant information is actually available to the devices participating in the secure application process.

With the aid of such a safety agent, not necessarily integrated into the network master however, the safety-related control unit 200 need no longer know the structure of the overall network, since in effect a virtually superimposed safety-related network structure is constructed, by means of which the standard network can be operated using operating means and access rules provided by the communication master.

The embodiment of communication relationships for application of the invention in Web-based systems, shown highly simplified and schematically in FIG. 2, will be discussed in detail below as an example of the application in multi-master networks.

Figure 2:
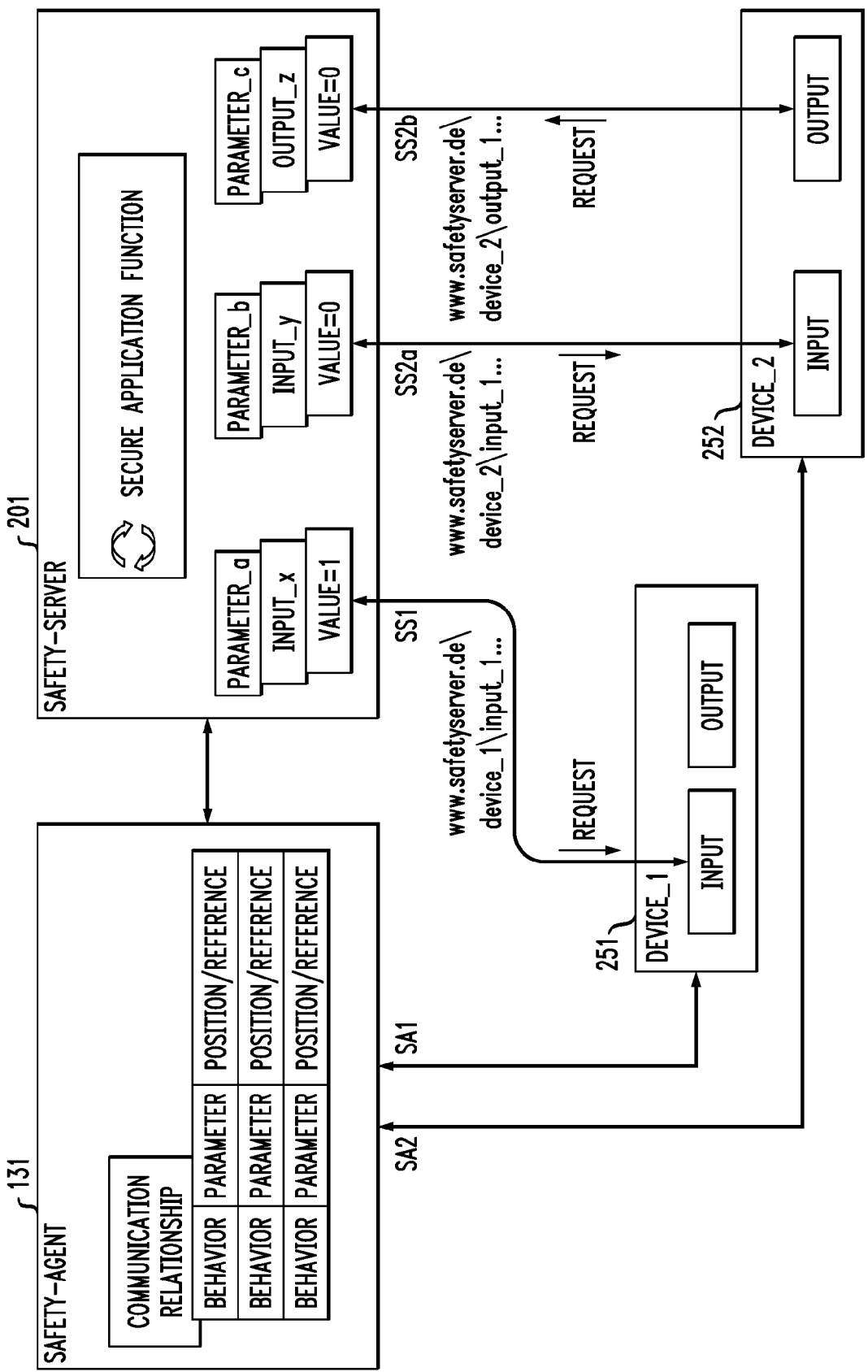
FIG. 2 shows, considerably simplified and schematically, the representation of an embodiment of communication relationships when the invention is used in Web-based systems.

In the example shown in FIG. 2, a safety-related server unit 201 with a secure application function to be run thereon is connected to an Internet or Intranet network, not shown in detail. At least during the project engineering phase, it is again advantageous for the sake of simplicity to connect to this network a safety agent 131 that first obtains or ascertains information as to which network components must be supplied with or receive safety-relevant data. The checking phase is represented in FIG. 2 by the double arrows labeled SA1 and SA2. From this information, the necessary information is then generated for the secure application program or secure application function, in particular, a required parameter description, and for the secure signal path, in particular, necessary information such as position, reference and behavior.

The parameter description defines, for instance, variables for the secure application program, as well as the direction of the communication, i.e., the relationships between server and client. Information regarding position and reference indicates the communications source or sink, for instance the complete access address via Web mechanisms. The point-to-point relationship between source and sink, important for safety engineering, as well as the time reference, is advantageously contained in this description. Behavior, in turn, reflects the expectation placed on the communication, e.g., the reaction time or the monitored switch-off time and the data. The replacement value strategy, which defines the behavior of variables in case of disruptions of the communication or the devices, and in case of deviations from the behavior to be expected, is advantageously also contained in this description.

This necessary information thus serves to organize the transmission of safety-relevant data regarding at least one of the network elements and/or the master unit over the network by means of the master unit, and defines unambiguous communication relationships SS1, SS2a or SS2b between the safety-related server unit 201 and the safety-related devices 251, 252, including the addresses under which they can be addressed in the network. This necessary information for the communication relationships is subsequently transferred to the safety-related server unit 201 and optionally also to the safety-relevant I/O devices 251 and 252. Insofar as the addresses are known, they can also be supplied via direct equipment projection to the terminal devices or the at least one secure controller. In this case an automatic safety agent function is not necessary.

For example, the communication relationship SS1 according to FIG. 2 thus defines an unambiguous point-to-point relationship between the safety-related server unit 201, which can be found under the address www.safetyserver.de\ in the network, and input 1 of device 1, the communication relationship SS2a defines an unambiguous point-to-point relationship between the server unit 201 and input 1 of device 2, and the communications relationship SS2b defines an unambiguous point-to-point relationship between the safety-related server unit 201 and output 1 of device 2.

The safety-related controller 201 operating as a safety server executes the secure application program or the secure application function and, in turn, makes the processing results available via the network. These processing results are formed from the input information.

The communication between the safety server and the secure devices 1 and 2 labeled with the reference numbers 251 and 252 in FIG. 2 can then be organized via the standard mechanisms of the underlying network, i.e., via standard Internet mechanisms. The safety server 201 and the secure devices 251 and 252 thus contain only the data from the safety agent 131 for the required safety-relevant communications relationships among one another. Thereupon, the safety-related controller 201 organizes the transmission of the safety-relevant data via the network, so that the safety-related devices are capable of accessing the safety-relevant data of the safety-related controller 201 or of the safety-related equipment.

As is the case for the standard Internet, the system according to the invention also operates independently of the underlying network. Only the indication of the endpoints, i.e., the Web address, is necessary.

This mechanism can be employed equally well in field-buses or Ethernet applications with a central master, as in wireless or multi-master networks. Less high-performance applications, such as usually occur in building technology, can thus implement safety engineering solutions with standard networks easily, and without additional network installation configuration.

Unlike existing solutions, the safety-related controller functioning as a separate safety controller can cooperate with different standard controllers and networks. Moreover, the performance of the secure application can be increased without having to restructure network structures or applications. The safety-related controller functionality can be implemented in the underlying network not just as a master, but also as a slave.

To summarize, the safety server processes data assigned to it, which is transported to it by the network, and again makes the results available to the network. In a preferred configuration, the safety server can consequently receive requests to process safety-relevant data from the network master and/or another component. As a result, secure information, e.g., in the form of a secured protocol, is available. This can be retrieved by the network master and sent off. Particularly on an Internet basis, the other components can also independently retrieve the data and/or provide it to the safety server. In this case, the safety server is operated virtually in parallel with the network master units and standard controllers, and the network transports the safety-relevant data essentially independently of the standard network traffic.

If errors, such as loss, confusion or delay of telegrams and/or erroneous addressing appear in the components, particularly in the standard components such as network, network master and so on, or also in the safety agent, they are recognized by the superimposed safety protocol in the safety-related components, which then perform safety-relevant reactions such as shutting down certain actuators or subunits in order, in particular, to transition the safety-critical process into a secure state.

The security controller is thus independent of a standard controller. It is possible, for instance, for several standard processes to be served with the results made available to the network by the safety controller, which leads to a cost reduction. Moreover, the availability of the safety function can be preserved in case of a loss of the standard functions.

It is understood that the characteristics of the invention presented above can be used, not just in the respectively described combinations, but also in other combinations or alone, insofar as not otherwise expressly indicated, without departing from the scope of the present invention.

The invention claimed is:

1. A data processing and transmission system for operating at least one non-safety-critical application process and at least one safety-critical application process, comprising:
    a data transmission network;
    at least one non-safety-related network element, linked to the non-safety-critical application process and connected to the network;
    at least one safety-related network element, linked to the safety-critical application process and connected to the network;
    at least one master unit connected to the network;
    a safety-related server unit connected to the network separately from the master unit, for controlling the at least one safety-critical application process by processing safety-relevant data necessary for controlling the safety-critical application process; and
    an allocation unit connected to the network, wherein the allocation unit is constructed to
        i) determine network elements connected to the network that are relevant to controlling of the safety-critical application process and that must be supplied with the safety-relevant data, or must obtain the safety-relevant data,
        ii) generate information describing the determined network elements,
        iii) provide the safety-related server unit and the determined network elements with the generated information, and
        iv) initialize the master unit by means of the generated information in order to provide operating means and access rules for a transmission of the safety-relevant data between the safety-related server unit and the determined network elements,
    wherein the transmission of the safety-relevant data is organized by the safety-related server unit according to a safety communication superimposed to a standard communication of the data transmission network, the safety communication is between the safety-related server unit and the determined network elements, and wherein the safety-critical application process is controlled independently of the non-safety-critical application process and can be operated independently of the data transmission network structure and protocols; and
    wherein the master unit is initialized in order to operate the network in such a manner that a superimposed safety-related network structure is provided and, based on a standard communication via the network, a superimposed safety communication is possible according to a safety communication protocol superimposed to a standard communication of the data transmission network.

2. The data processing and transmission system according to claim 1, wherein the allocation unit is constructed to determine the connected network elements that are relevant to the control of the safety-critical application process by interaction with the master unit.

3. The data processing and transmission system according to claim 1, wherein the allocation unit is integrated in the master unit.

4. The data processing and transmission system according to claim 1, wherein the information generated by the allocation unit and describing the determined network elements comprises parameter descriptions and/or details of a secure signal path like addresses, communication source and sink, time reference, reaction time, switch-off time and replacement values.

5. The data processing and transmission system according to claim 1, wherein the safety-relevant data is available in the form of a secured protocol.

* * * * *